(12) United States Patent
Adam et al.

(10) Patent No.: US 9,183,415 B2
(45) Date of Patent: Nov. 10, 2015

(54) REGULATING ACCESS USING INFORMATION REGARDING A HOST MACHINE OF A PORTABLE STORAGE DRIVE

(75) Inventors: Preston Derek Adam, Woodinville, WA (US); Sai Vinayak, Redmond, WA (US); Octavian T. Ureche, Bellevue, WA (US); Stefan Thom, Snohomish, WA (US); Himanshu Soni, Redmond, WA (US); Nicolae Voicu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 13/309,204

(22) Filed: Dec. 1, 2011

(65) Prior Publication Data

US 2013/0145139 A1 Jun. 6, 2013

(51) Int. Cl.
*G06F 15/177* (2006.01)
*G06F 1/24* (2006.01)
(Continued)

(52) U.S. Cl.
CPC ........... *G06F 21/78* (2013.01); *G06F 21/40* (2013.01); *G06F 21/72* (2013.01); *G06F 21/73* (2013.01);
(Continued)

(58) Field of Classification Search
CPC ..... G06F 21/575; G06F 21/57; G06F 9/4406; G06F 21/572; G06F 21/30; G06F 21/77; G06F 9/4401; G06F 21/10; G06F 21/31; G06F 21/07; G06F 21/6218; G06F 21/6209; G06F 21/71; G06F 21/34; G06F 12/1408; G06F 2221/214; G06F 21/6281

USPC ................. 713/1, 2, 164, 165, 166, 167, 185; 726/1, 2, 17–21, 26–29
See application file for complete search history.

(56) References Cited

U.S. PATENT DOCUMENTS

| 8,028,172 | B2 | 9/2011 | Hunter et al. |
| 8,214,632 | B2 * | 7/2012 | Choi et al. ................. 713/2 |

(Continued)

FOREIGN PATENT DOCUMENTS

EP 2169908 A1 * 3/2010 ............. G06F 21/00

OTHER PUBLICATIONS

Bitlocker to go—Enabling Digital Society—Site Home—MSDN Blogs, Mar. 1, 2009.*
(Continued)

*Primary Examiner* — Tae Kim
(74) *Attorney, Agent, or Firm* — Timothy Churna; Judy Yee; Micky Minhas

(57) ABSTRACT

Described herein are techniques for regulating access to a portable storage drive, that stores an operating system securely, using information regarding a host machine. In accordance with some of the techniques described herein, when a portable storage drive that stores an operating system securely is to be accessed by a host machine, information regarding the host machine, such as information regarding the hardware of the host machine, may be retrieved and evaluated to determine whether to grant access to the host machine. When the host machine is granted access, the host machine may access secured data stored on the portable storage drive in any suitable manner. In some cases, accessing the secured data may include decrypting the secured data and transferring decrypted data to another storage of the host machine. The decrypted information may include an operating system that is booted by the host machine.

8 Claims, 10 Drawing Sheets

(51) Int. Cl.
H04L 29/06 (2006.01)
G06F 21/00 (2013.01)
G06F 7/04 (2006.01)
G06F 17/30 (2006.01)
H04N 7/16 (2011.01)
G06F 12/00 (2006.01)
G06F 21/78 (2013.01)
G06F 21/40 (2013.01)
G06F 21/72 (2013.01)
G06F 21/73 (2013.01)
H04L 9/08 (2006.01)

(52) U.S. Cl.
CPC ...... *H04L 9/0897* (2013.01); *G06F 2221/2107* (2013.01); *G06F 2221/2129* (2013.01); *G06F 2221/2141* (2013.01)

(56) References Cited

U.S. PATENT DOCUMENTS

| | | | |
|---|---|---|---|
| 8,245,293 B2* | 8/2012 | Huang | 726/20 |
| 8,392,539 B1* | 3/2013 | Chen et al. | 709/220 |
| 2004/0123127 A1* | 6/2004 | Teicher et al. | 713/193 |
| 2005/0060568 A1* | 3/2005 | Beresnevichiene et al. | 713/200 |
| 2005/0138423 A1* | 6/2005 | Ranganathan | 713/201 |
| 2006/0047944 A1* | 3/2006 | Kilian-Kehr | 713/2 |
| 2006/0107032 A1* | 5/2006 | Paaske et al. | 713/2 |
| 2007/0016941 A1 | 1/2007 | Gonzalez et al. | |
| 2007/0136580 A1* | 6/2007 | Anand et al. | 713/168 |
| 2008/0016553 A1* | 1/2008 | Liu et al. | 726/3 |
| 2008/0141042 A1* | 6/2008 | Lo | 713/193 |
| 2008/0148388 A1* | 6/2008 | Wooten et al. | 726/17 |
| 2008/0215872 A1* | 9/2008 | Choi et al. | 713/2 |
| 2009/0031403 A1* | 1/2009 | Huang | 726/4 |
| 2009/0183256 A1* | 7/2009 | Mo et al. | 726/21 |
| 2009/0210456 A1 | 8/2009 | Subramaniam | |
| 2009/0217056 A1 | 8/2009 | Malpani | |
| 2009/0276620 A1 | 11/2009 | McCarron et al. | |
| 2009/0319782 A1 | 12/2009 | Lee | |
| 2010/0070728 A1 | 3/2010 | James et al. | |
| 2010/0082960 A1* | 4/2010 | Grobman et al. | 713/2 |
| 2010/0082987 A1* | 4/2010 | Thom et al. | 713/171 |
| 2010/0086134 A1* | 4/2010 | Ureche et al. | 380/277 |
| 2010/0287363 A1* | 11/2010 | Thorsen | 713/2 |
| 2011/0035574 A1* | 2/2011 | Jevans et al. | 713/2 |
| 2011/0246773 A1* | 10/2011 | Sidle et al. | 713/168 |
| 2012/0011354 A1* | 1/2012 | Owen | 713/2 |
| 2012/0084544 A1* | 4/2012 | Farina et al. | 713/2 |
| 2012/0084545 A1* | 4/2012 | Farina et al. | 713/2 |
| 2012/0278606 A1* | 11/2012 | Huang | 713/2 |
| 2012/0278866 A1* | 11/2012 | Huang | 726/4 |
| 2013/0061032 A1* | 3/2013 | Suginaka et al. | 713/2 |

OTHER PUBLICATIONS

"BitLocker Drive Encryption" from Wikipedia, the free encyclopedia, available at: http://en.wikipedia.org/wiki/BitLocker_Drive_Encryption, published/last modified on Jun. 14, 2011, Retrieved Date: Aug. 1, 2011.

"Bitlocker to go, Enabling Digital Society" available at: http://blogs.msdn.com/b/rockyh/archive/2009/03/01/bitlocker-to-go.aspx, Mar. 1, 2009, Retrieved Date: Oct. 19, 2011.

"Hardware restrictions" from Wikipedia, the free encyclopedia, available at: http://en.wikipedia.org/wiki/Secure_boot, published/last modified on Oct. 11, 2011, Retrieved Date: Oct. 12, 2011.

"Live USB" from Wikipedia, the free encyclopedia, available at: http://en.wikipedia.org/wiki/Live_USB, published/last modified on Oct. 12, 2011, Retreived Date: Oct. 12, 2011.

"Trusted Platform Module" from Wikipedia, the free encyclopedia, available at: http://en.wikipedia.org/wiki/Trusted_Platform_Module, published/last modified on Oct. 6, 2011, Retreived Date: Oct. 12, 2011.

"VHD (file format)" from Wikipedia, the free encyclopedia, available at: http://en.wikipedia.org/wiki/VHD_(file format), published/last modified on Sep. 7, 2011, Retreived Date: Oct. 12, 2011.

"Volume license key" from Wikipedia, the free encyclopedia, available at: http://en.wikipedia.org/wiki/Volume_license_key, published/last modified on Oct. 11, 2011, Retreived Date: Oct. 12, 2011.

Andersen, "Threats and Countermeasures: Security Settings in Windows Server 2008 and Windows Vista" available at: http://download.microsoft.com/download/2/8/A/28A969A8-93B7-47A4-91A6-8918CC0B44B9/Threats%20and%20Countermeasures%20-%20Security%20Settings%20in%20Windows%20Server%202008%20and%20Windows%20Vista.pdf, Jan. 2009, Retrieved Date: Aug. 1, 2011.

Funk, "BitLocker™ Protecting data in Windows 7 and Windows Server 2008 R2" avialable at: http://download.microsoft.com/download/5/e/6/5e66b27b-988b-4f50-af3a-c2ffle62180f/ent-t561_wh08.pptx, 2008, Retrieved Date: Aug. 1, 2011.

Houston et al., "CS252 Project, An Encrypted File System using TPM" available at: http://www.thomaskho.com/berkeley-eecs/classes/252/project7_report_ver3.pdf, May 14, 2007.

Kirkpatrick et al., "Physically Restricted Authentication with Trusted Hardware" available at: https://www.cerias.purdue.edu/assets/pdf/bibtex_archive/2009-18-report.pdf, Proceedings of the 2009 ACM workshop on Scalable trusted computing (STC '09), Retrieved Date: Aug. 2, 2011.

Microsoft Corporation, Microsoft Windows, "BitLocker Drive Encryption: Scenarios, User Experience, and Flow" May 16, 2006.

Sandhu et al., "Peer-to-Peer Access Control Architecture Using Trusted Computing Technology" Proceedings of the tenth ACM symposium on Access control models and technologies (SACMAT'05), Jun. 1-3, 2005, available at: http://profsandhu.com/it862/it862s05/TC-body2-acmformat.pdf.

Office Action mailed Jul. 28, 2014, U.S. Appl. No. 13/327,013, filed Dec. 15, 2011.

"Final Office Action Received for U.S. Appl. No. 13/327,013", Mailed Date: Nov. 19, 2014, 21 Pages.

"Non-Final Rejection Received for U.S. Appl. No. 13/327,013", Mailed Date: Jun. 11, 2015, 20 Pages.

* cited by examiner

REGULATING ACCESS USING INFORMATION REGARDING A HOST MACHINE OF A PORTABLE STORAGE DRIVE

BACKGROUND

An operating system can be used to govern operations of a computing device and regulate use of hardware of a computing device, among other functions. To do so, the operating system is loaded from a storage drive accessible by the computing device, after which a processor of the computing device executes the operating system instructions. Multiple different types of storage drives can be used to store an operating system.

For example, an operating system can be stored in an internal storage device of a computing device, which could be a hard disk drive (HDD) or a solid-state drive (SSD). Such internal storage devices are hardware resources that are fixed components of computing devices. As fixed hardware resources, the internal storage drives may be configured to be used with only a single computing device. Such fixed hardware resources may be attached to a computing device in several different manners, including by being removably coupled to the computing device and being disposed inside a housing of the computing device.

Another type of storage drive that may be used to store an operating system is a portable storage drive. A portable storage drive is not a fixed resource of any particular computing device. A portable storage drive is not uniquely associated with any particular computing device. Rather, multiple different computing devices may be used as host machines for the portable storage drive without changing a configuration of the portable storage drive and/or without changing a hardware configuration of the computing devices with which the portable storage drive is used. Such a portable storage drive may be used with multiple different computing devices without negatively affecting any of those computing devices when the portable storage drive is not present, in that the computing devices may still be operable when the portable storage drive is not present. In some cases, a portable storage drive may be bootable, in that the portable storage drive may include a boot sector that may be read by boot firmware of a computing device as part of bootstrapping a computing device and loading an operating system.

Where such portable storage drives are to be used with physical computing devices, the portable storage drives may be physical hardware. One example of a portable storage drive that is physical hardware is a flash memory drive adapted to interface with a computing device via Universal Serial Bus (USB). Portable storage drives may also be used with virtual computing devices (also called virtual machines) and, in these cases, may themselves be virtual. One example of a portable storage drive that is virtual is a virtual hard drive (VHD) that can be associated with one or more virtual computing devices and used to store information for the virtual computing device(s).

A portable storage drive may store an operating system that is also portable, in that the operating system is not uniquely associated with hardware of any particular computing device that may act as a host machine for the operating system. Such an operating system can be used with multiple computing devices without substantially changing the configuration of the operating system. By not substantially changing the configuration of the operating system, even while or after the operating system is used with a different computing device, the operating system may remain operable with other computing devices. In some cases, the operating system may be adapted for use with multiple different hardware configurations.

When a computing device is to act as a host machine for an operating system stored on a portable storage drive, the computer-executable instructions for the operating system may be loaded from the portable storage drive into another storage of the host machine, including one or more internal storage devices like system memories, and may be executed by one or more processor(s) of the host machine. By doing so, the host machine may be operated and governed by an operating system that is not originally retrieved from an internal storage device of the host machine, but is instead originally retrieved from a portable storage device. This might be useful in some environments where, for example, a user wants to use the portable operating system with the host machine for only a short time, without replacing the usual operating system of the host machine that may be stored on an internal storage device.

One example of a portable operating system that can be used with portable storage drives is the WINDOWS TO GO™ system available from the Microsoft Corporation of Redmond, Wash.

SUMMARY

Applicants have recognized and appreciated that security techniques available for portable storage drives that store operating systems are insufficient. For example, currently-available security techniques do not limit the use of such portable storage drives to any particular computing device or hardware. Because of this, if security techniques used with a portable storage drive were bypassed, the storage drive could be accessed by any computing device and information stored in the storage drive (such as the operating system) could be compromised. Further, Applicants have recognized and appreciated that conventional security techniques for portable storage drives that store operating systems focus on protecting only user information stored in the portable storage drive, while other information stored in a drive, including operating system information, may be vulnerable to attack or theft and may be valuable, and therefore should be secured.

Applicants have recognized and appreciated that if portable storage drives that store operating systems could be limited to use with particular computing devices and if more information were secured, including the operating systems stored in portable storage drives, the security of these drives could be improved.

Described herein are techniques for regulating access to a portable storage drive that stores an operating system using information regarding a host machine. In accordance with some of the techniques described herein, when a portable storage drive that stores an operating system is to be accessed by a host machine, information regarding the host machine, such as information regarding the hardware of the host machine, may be retrieved and evaluated to determine whether to grant access to the host machine. When the host machine is granted access, the host machine may access secured data stored on the portable storage drive in any suitable manner. In some cases, accessing the secured data may include decrypting the secured data and transferring decrypted data to another storage of the host machine. The decrypted information may include an operating system that is booted by the host machine.

In some embodiments, an access facility may determine whether the host machine is permitted to access the portable storage drive. The access facility may communicate with boot firmware for the host machine to retrieve the information regarding the host machine. When the access facility determines that the host machine is permitted access, the access facility may enable the boot firmware to decrypt an operating system stored on the portable storage drive and load and execute the operating system on the host machine, such as by communicating key information to the boot firmware and/or to a hardware element of the host machine. Such a hardware element of the host machine may be, for example, a hardware cryptoprocessor of the host machine.

Embodiments are not limited to using information regarding a host machine in any particular manner or to using any particular type of information regarding the host machine. In some embodiments, information regarding a host machine may be key information to be used as part of decrypting secured data stored on the portable storage drive, such as key information to decrypt the secured data or key information to decrypt other key information for the secured data. Additionally or alternatively, information regarding the host machine may be used to obtain a credential and the credential may be used to access the host machine. For example, information regarding the host machine may be transmitted via a network and used to obtain key information to be used as part of decrypting secured data stored on the portable storage drive.

In some embodiments, through regulating access using information regarding host machines, a limited set of host machines with which a portable storage drive can be used may be created and managed. For example, the access facility may be used to regulate access to the portable storage drive such that only host machines that are known to be trusted machines may be used together with the portable storage drive.

Also described herein are techniques for regulating access to a remote resource using two-factor authentication using information regarding a host machine of a portable storage drive. Applicants have recognized and appreciated that conventional techniques for regulating access to a remote resource using strong authentication require a user to provide two credentials, one of which is typically derived from a cumbersome external resource such as a smart card. Such a requirement is an imposition on users in that the users have to carry the external resource and may additionally have to carry a reader for the external resource (e.g., a smart card reader). Applicants have further recognized and appreciated that such two-factor authentication could be improved through using information regarding a host machine of a portable storage drive as a second factor in a two-factor authentication. Such information regarding the host machine may include, in some embodiments, information retrieved from a secure storage of the host machine, such as from a cryptoprocessor of the host machine. The information may include an identifier for the host machine or may be a user credential pre-provisioned to the host machine to be used in two-factor authentication.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
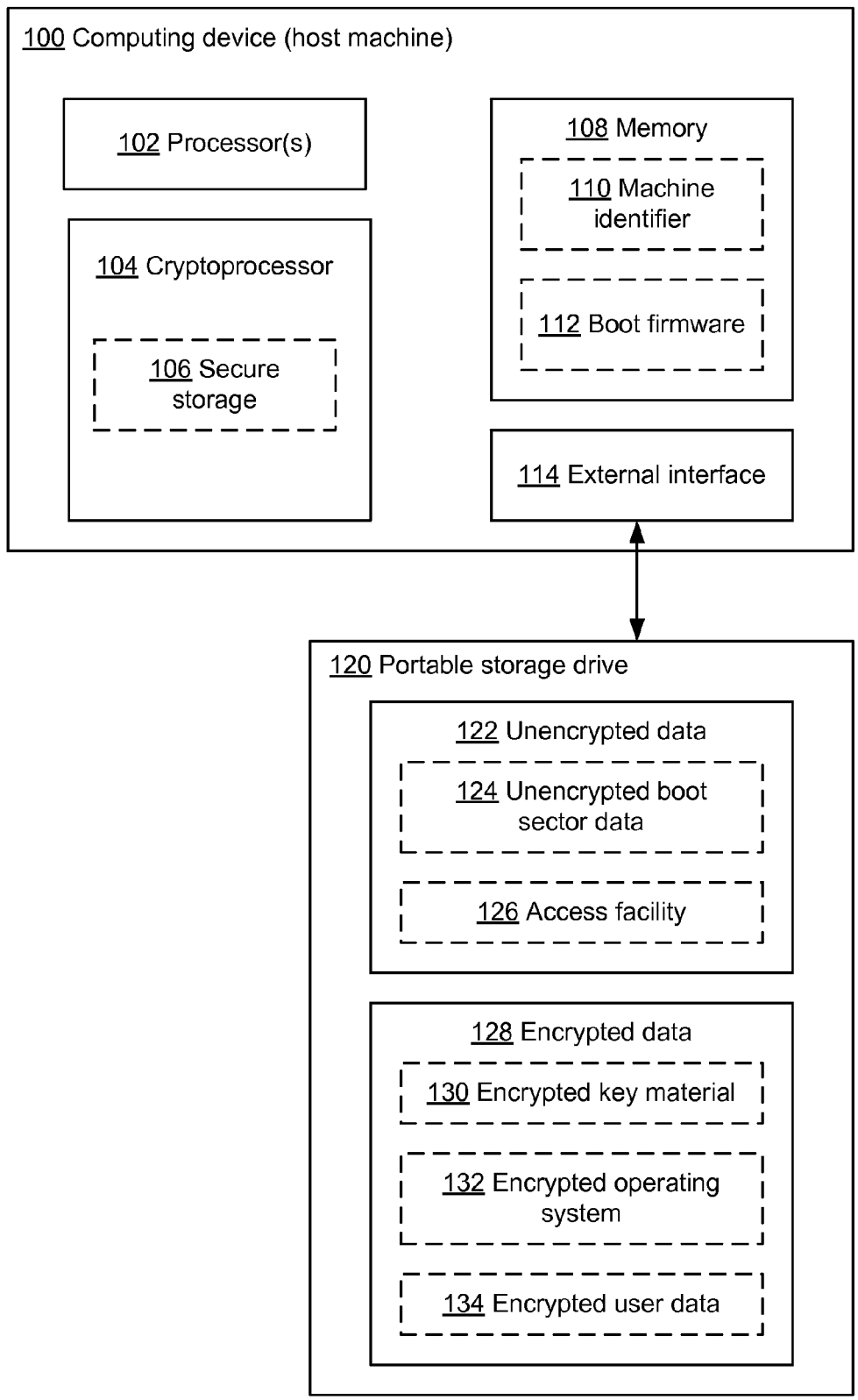
FIG. 1 is a block diagram of an exemplary computing environment in which some embodiments may act.

Conventional forms of security for portable storage drives that store operating systems rely on password protection for regulating access to the portable storage drive. For example, when a host machine is to boot from a portable storage drive by loading the operating system stored on the portable storage drive, a user may be prompted for a password and the password may be used to determine whether the user and the host machine are permitted access to the portable storage drive.

Applicants have recognized and appreciated, however, that password protection is an insufficient form of security for portable storage drives that store operating systems. Passwords may be intercepted or otherwise learned, or even guessed through a brute force technique. Once a password is compromised, the portable storage drive may be used by an attacker with any computing device. Accordingly, password protection offers little security for portable storage drives.

Further, Applicants have recognized and appreciated that even where password protection is used, conventionally very little of the data stored on a portable storage drive is protected with this security. Rather, in many cases only a portion of the data stored on portable storage drive is encrypted or otherwise secured. The secured portion is often the users folder of the drive that stores personal files for operating system users. Such a folder is often encrypted to secure the confidential data that may be stored by each user. Applicants have recognized and appreciated, however, that confidential data may be stored in many different locations in a portable storage drive. For example, confidential information associated with a user's employer could be scattered throughout a portable storage drive, including in operating system or network settings.

Applicants have recognized and appreciated that security for portable storage drives that store operating systems could be improved if more information stored on a portable storage drive were encrypted or otherwise secured. For example, that if more information on the portable storage drive, including instructions and settings for the operating system stored on the portable storage drive, were protected, the security of the portable storage drive would be increased. Applicants have further recognized and appreciated that limiting access to a portable storage drive to particular computing devices can further increase security of the portable storage drive. For example, if only particular computing devices were permitted access to secured data stored on a portable storage drive, the secured data could be more secure than if any user having a security key (e.g., a decryption key) could access the secured data using any computing device.

Described herein are various techniques for securing portable storage drives and the operating systems stored therein. In some embodiments, securing the portable storage drive includes securing the portable storage drives such that the portable storage drive is accessible only by a limited set of one or more computing devices. A portable storage drive may be secured by encrypting information stored on the portable storage drive, including by encrypting an operating system stored on the portable storage drive. Access to the portable storage drive may be regulated using information regarding a host machine with which the portable storage drive is to be used. In some embodiments, the information regarding the host machine may be used to determine whether the host machine is permitted to access the portable storage drive and the operating system stored therein.

As discussed below in more detail, information regarding the host machine can be used to regulate access to the portable storage drive in various ways. In some embodiments, the information regarding the host machine may be key material held by hardware of the host machine and the key material may be used as part of accessing secured information on the portable storage drive, such as by decrypting operating system instructions. In other embodiments, the information regarding the host machine may be an identifier for the host machine that may be used to obtain a credential for obtaining access to the portal storage drive and to the secured data. Where such a credential is used, the credential may be obtained in any suitable manner. In some embodiments, a credential may be obtained by communicating the identifier for the host machine to a remote server over a computer communication network and obtaining the credential in response. The remote server may return the credential when the host machine is determined to be a machine permitted to access the portable storage drive.

Accordingly, in embodiments, either or both of key material stored on the host machine and a credential obtained for the host machine may be used to determine whether the host machine is permitted to access the portable storage drive. If the host machine is permitted, the host machine may access secured data stored on the portable storage drive, such as by reading and decrypting the data stored on the portable storage drive. Accessing and decrypting the data may, in some embodiments, include loading an operating system from the portable storage drive on the host machine and executing the operating system on the host machine.

Also described herein are techniques for regulating access to a remote resource using two-factor authentication using information regarding a host machine of a portable storage drive. Applicants have recognized and appreciated that conventional techniques for regulating access to a remote resource using strong authentication require a user to provide two credentials. Such two-factor authentication is typically based on the design technique "what you know and what you have," meaning that one factor of the authentication may be based on something within the user's knowledge and another may be based on something in the user's possession. In many cases, a password satisfies the requirement of something within the user's knowledge while an external resource, such as a smart card, possessed by the user provides a credential that satisfies the requirement for something within the user's possession. Alternatively, two-factor authentication may be based on the design technique "what you are and what you have," meaning that one factor of the authentication may be based on some identifying set of biometric measurements for a user and another may be based on something in the user's possession. Fingerprints or any other suitable biometric measurements could satisfy the requirement for an identifying set of measurements of the user. Where fingerprints are used in two-factor authentication, a fingerprint reader could be used to collect the biometric measurement.

Applicants have recognized and appreciated that the traditional two-factor authentication techniques (whether based on the "what you know" or the "what you are" design technique) are undesirable. In particular, the requirement of an external resource is an imposition on users in that the users have to carry the external resource and bring the external resource to the host machine from which access will be sought. In some cases, the users may additionally have to carry a reader for the external resource (e.g., a smart card reader) such that the external resource is able to provide the credential to the host machine.

Applicants have recognized and appreciated that two-factor authentication could be improved through using information regarding a host machine of a portable storage drive as a second factor in a two-factor authentication. Such information regarding the host machine may include, in some embodiments, information retrieved from a secure storage of the host machine, such as from a cryptoprocessor of the host machine. The information may include an identifier for the host machine or may be a user credential pre-provisioned to the host machine to be used in two-factor authentication. By using in two-factor authentication information regarding the host machine that is stored by the host machine or can be derived from the host machine, the user is alleviated of the burden of carrying an external resource. Rather, the user can rely on the host machine to provide the second credential for two-factor authentication. Further, increased security may be offered by using the information regarding the host machine, as such a technique limits successful two-factor authentication to only host machines that have available to them the appropriate credential. As such, remote access or other activities for which authentication is sought can be restricted to being performed on a limited set of host machines.

Described below are various examples of ways in which the techniques described herein may be implemented. It should be appreciated, however, that arguments are not limited to being implemented according to any of the examples below, as the techniques herein may be implemented in any suitable manner.

In various examples below, the portable storage drive may be described as a physical drive, such as a flash memory drive having a USB interface, and the host machine may be described as a physical computing device such as a laptop or desktop personal computer. It should be appreciated that these are merely illustrative examples of the ways in which portable storage drives and host machines may be implemented, and that embodiments are not limited to operating with these portable storage drives and host machine or any other particular drives or machines. In other embodiments, for example, a portable storage drive may be a virtual drive like a virtual hard drive (VHD) and a host machine may be a virtual machine. Embodiments are not limited to operating with any particular type or types of portable storage drives or host machines.

Obtaining Access to a Secured Operating System

FIG. 1 illustrates an exemplary environment in which some embodiments may operate. FIG. 1 includes a computing device 100 that may act as a host machine for a portable storage drive 120 that stores an operating system. As discussed above and as described in greater detail below, the computing device 100 may load an operating system from the portable storage drive 120 and execute the operating system on the computing device 100. Prior to loading and executing the operating system, however, a determination is made as to whether the computing device 100 is permitted to act as a host machine for the portable storage drive 120 and permitted to access secured data of the portable storage drive 120, the secured data including the operating system. When the computing device 100 is determined to be permitted to access the portable storage drive 120, the computing device 100 may decrypt the secured operating system, load the operating system, and execute the operating system on the computing device 100.

Computing device 100 may be any suitable computing device, including a laptop or desktop personal computer, tablet computer, smart mobile phone, personal digital assistant (PDA), or any other computing device. As shown in FIG. 1, computing device 100 includes at least one processor 102 that may execute instructions to carry out operations on the computing device 100. The computing device 100 also includes a cryptoprocessor 104. Cryptoprocessor 104 includes secure hardware to perform security functionality for the computing device 100. The cryptoprocessor 104 may include any suitable hardware for performing the security functionality, as embodiments are not limited in this respect. In some embodiments, the cryptoprocessor 104 may be a Trusted Platform Module (TPM) chip operating according to a TPM protocol to carry out the security functionality. The functionality of the cryptoprocessor 104 may include any suitable security functionality known in the art. For example, cryptoprocessor 104 may perform secure computations and store data in a secure storage 106. The data stored in the secure storage 106 may include data to be used in security operations for the computing device 100, such as key material and identifiers for the computing device 100. In some cases, the data stored in the secure storage 106 may include characteristics of the computing device 100 to be used in determining whether the computing device 100 is operating correctly. For example, Platform Configuration Registers (PCRs) of a TPM may be used to store characteristics of a boot sequence of the computing device 100 that can be used later to determine whether the boot sequence is proceeding normally or has been disrupted in some way, which could indicate an attack on the computing device 100. As discussed in greater detail below, the cryptoprocessor 104, including data stored in the secure storage 106, may be used in some embodiments as part of determining whether the computing device 100 is permitted to act as a host machine for the portable storage drive 120 and is permitted to access secured data (including the operating system 120) stored on the portable storage drive 120.

The computing device 100 shown in FIG. 1 also includes a memory 108. Memory 108 may be implemented as any suitable one or more hardware storages for a computing device, including as volatile and/or nonvolatile storages. In some embodiments, for example, the memory 108 may be one or more random access memories (RAM) and/or one or more secure storages associated with firmware such as the Unified Extensible Firmware Interface (UEFI). As shown in FIG. 1, the memory 108 may store various data to be used by the computing device 100. The data stored by the memory 108 may include instructions to be executed by the processor(s) 102 and/or stored data to be manipulated by the processor(s) 102. The exemplary data illustrated in FIG. 1 includes machine identifiers 110 and boot firmware 112.

As discussed in greater detail below, the machine identifiers 110 may include any suitable identifiers for the computing device 100, including identifiers associated with hardware of the computing device 100, identifiers associated with computing device 100, and identifiers assigned to the computing device 100 by one or more communication networks to which the computing device 100 is connected. In some embodiments, a machine identifier 110 may be a Medium Access Control (MAC) address associated with a network interface of the computing device 100 or a network address assigned to the computing device 100 by an enterprise network to which the computing device 100 is connected, though other identifiers may be used instead of or in addition to these exemplary identifiers.

Memory 108 may also store boot firmware 112 that can be executed by the processor 102 as part of bootstrapping the computing device 100. In some embodiments, the boot firmware 112 may load an operating system on the computing device 100, for execution by the processor 102, from the portable storage drive 120.

The computing device 100 may also include hardware forming an external interface 114. The external interface 114 may couple the computing device 100 to a portable storage drive 120 such that the computing device 100 may communicate with the portable storage drive 120 and copy information stored on the portable storage drive 120 to local storages of the computing device 100, such as the memory 108. The external interface 114 may be any suitable interface that includes any suitable hardware, as embodiments are not limited in this respect. In some embodiments, for example, the external interface 114 may be a universal serial bus (USB) interface that communicates data using the USB protocol, though in other embodiments other interfaces may be used.

The portable storage drive 120 may be any suitable portable storage drive. As discussed above, a portable storage drive is not a fixed resource of any particular computing device and may be used with multiple different computing devices. In some embodiments, therefore, the portable storage drive 120 may be a storage drive that is used with multiple different computing devices each acting as a host machine at different times without changing a configuration of portable storage drive 120 or without changing the configuration in any way that would make the drive inoperable with other computing devices. Because the configuration of the portable storage drive 120 is not changed in any way that would make the drive inoperable with other devices when the portable storage driver 120 is used with a computing device, after being used with a new computing device, the portable storage drive 120 can be used with other new computing devices or with previous computing devices without changing again the configuration of the portable storage drive 120. The portable storage drive 120 may be any suitable type of portable drive for use with different computing devices, including a physical hardware drive or a virtual drive. In some embodiments, the portable storage drive 120 may be a solid-state memory drive that can interact with a host machine via a hardware interface. For example, the portable storage drive 120 may be a USB memory drive that can interact with the computing device 100 via a USB interface 114.

The portable storage drive 120 may store any suitable data for use by the computing device 100, including instructions for execution by the processor 102 of the computing device 100. The data stored by the storage drive 120 may be stored as both encrypted data and unencrypted data. The unencrypted data 122 may include information that is unsecured and therefore may be accessed by any computing device 100 that is capable of reading data stored on a portable storage drive. As illustrated in FIG. 1, the unencrypted data 122 may include unencrypted boot sector data 124. The boot sector data 124 may include any suitable data that may be stored in a boot sector of an operating system volume, as is known in the art. For example, boot record information, such as the information that may be stored in a master boot record (MBR) may be stored in the boot sector data 124. The boot sector data 124 may aid the computing device 100 in booting from the portable storage drive 120 and loading an operating system from the portable storage drive 120 for execution on the computing device 100.

The unencrypted data 122 may also, in some embodiments, include an access facility 126. Access facility 126 may be used to determine whether a host machine that is attempting to access or requesting access to secured data of the portable storage drive is permitted to access the secured data, including the operating system. The access facility 126 may be stored in an unencrypted form such that the access facility 126 may be loaded from the portable storage drive 120 and executed by the processor(s) 102 of the computing device 100. As discussed in detail below, different embodiments may determine in different ways whether a computing device is permitted to access the secured data. In some embodiments, key material stored by the computing device 100 (e.g., by the cryptoprocessor 104) may be used in decryption operations that, if successful, indicate that the computing device 100 is permitted to access the secured data of the portable storage drive 120. In other embodiments, however, an access facility 126 may be used to collect information regarding the computing device 100, such as by collecting machine identifiers 110, and review that information in some way as part of determining whether access should be permitted. For example, the access facility 126 may review the information by communicating at least some of the information via a communication network to a remote server that determines whether access is to be granted. Additionally or alternatively, the access facility 126 may review information locally, through carrying out operations on the computing device 100, to determine whether the computing device 100 is permitted to access the secured data of the portable storage drive 120. Regardless of the operations that are to be carried out by the access facility 126, where such an access facility 126 is used, the access facility 126 may be loaded and executed by the computing device 100. In some embodiments, the access facility 126 is loaded and executed by the boot firmware 112 of the computing device 100. For example, the boot sector data 124 of the portable storage drive 120, when read by the boot firmware 112 during a boot process for the computing device 100, may trigger execution of the access facility 126 to determine whether the computing device 100 is permitted to access the secured data.

The portable storage drive 120 also includes secured data, including encrypted data 128. Encrypted data 128 is stored in a secured manner on the drive 120 according to any suitable encryption algorithm and can be decrypted through use of a decryption key. In some embodiments, multiple decryption keys may be used to obtain access to the secured data. For example, in some embodiments the secured data of the portable storage drive may be encrypted using the BITLOCKER® drive encryption system available from the Microsoft Corporation of Redmond, Wash. When the BITLOCKER® system is used, secured data may be secured using a set of multiple encryption keys. Each of the set of multiple encryption keys can be used as a different layer in the encryption scheme for the portable storage drive 120. For example, some of the secured data on the portable storage drive 120 may be encrypted such that a first key, known as a full volume encryption key (FVEK), can be used to decrypt the secured data. The first key can be stored in encrypted form on the portable storage drive 120 such that the first key can be decrypted using a second key, the volume master key (VMK). The second key can then also be stored in at least one encrypted form on the portable storage drive 120 such that it can be decrypted using at least one third key. In some embodiments, an encrypted form of the second key (a BITLOCKER® protector) can be stored on the portable storage drive 120 for each computing device that is permitted to act as a host machine for the portable storage drive 120 and permitted to access the secured data stored therein, and each permitted computing device may be associated with a different key to permit decryption of the second key. In other embodiments, a single encrypted form of the second key may be stored and each permitted computing device may have access to a key that decrypts the second key. In still other embodiments, a hybrid system may be used, where some encrypted forms of the second key are unique to particular computing devices while other encrypted forms of the second key may be shared between computing devices. Regardless of how the keys are stored, in some embodiments that operate according to the BITLOCKER® system or a similar system, once a permitted computing device has decrypted the second key through use of a key to which the permitted computing device has access, the second key may be used to decrypt the first key, and the first key may be used to decrypt and access data stored on the portable storage drive 120, including the operating system 132.

FIG. 1 illustrates several types of encrypted data 128 that may be stored on the portable storage drive 120. The encrypted data 128 may include key material 130, which in some embodiments may include encrypted forms of the first key and second key, as discussed above. The encrypted data 128 may also include an operating system 132 that can be loaded from the portable storage drive 120 and executed by processor(s) 102 of the computing device 100. The encrypted operating system 132 may include any suitable operating system parts, including instructions, settings, and other data for an operating system. As the operating system 132 is stored in encrypted form, the computing device 100 will only be able to load and execute the instructions of the operating system 132 if the computing device 100 is permitted to access the secured data 128 of the portable storage drive 120 and decrypts the instructions of the operating system 132. FIG. 1 also illustrates that the encrypted data 128 may include encrypted user data 134, which may include any suitable user data, including user-created files of any type, as embodiments are not limited in this respect.

Figure 2:
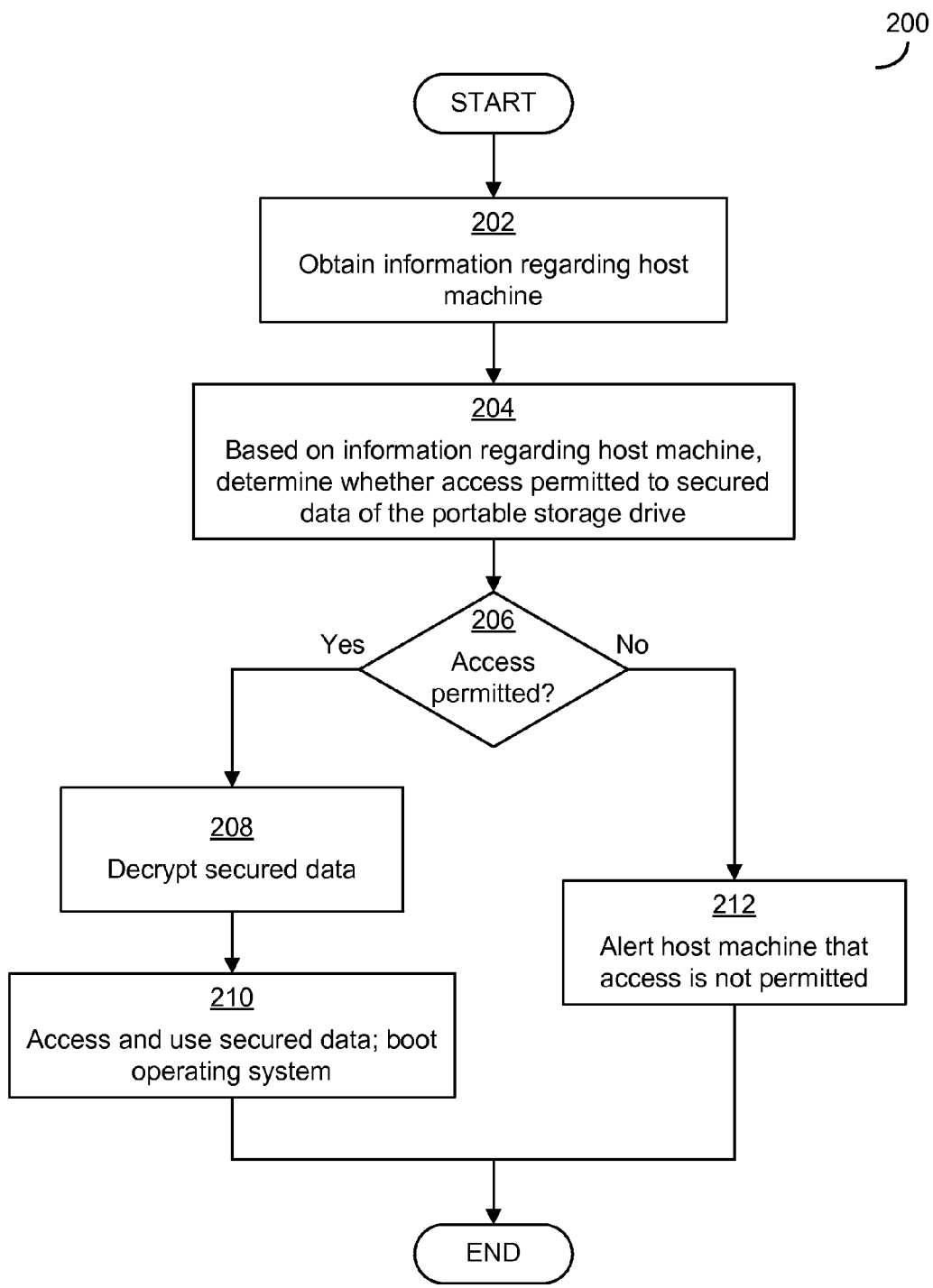
FIG. 2 is a flowchart of an exemplary process for determining whether a host machine is permitted to access secured data of a portable storage drive.

As discussed above, a determination may be made in any suitable manner regarding whether a computing device (e.g., computing device 100) is permitted to act as a host machine for a portable storage drive and permitted to access secured data, including an operating system, stored on the portable storage drive. FIG. 2 illustrates one example of a way in which such a determination may be made.

Prior to the start of the process 200 of FIG. 2, a portable storage drive may have been coupled to a host machine via a hardware interface of the host machine. For example, if the portable storage drive were a USB memory drive, the USB memory drive may have been coupled to the host machine via a hardware USB interface of the host machine. After the portable storage drive is coupled, the boot firmware of the host machine attempts to boot the host machine from the portable storage drive by using the portable storage drive as an operating system volume for the host machine. As part of that process, the boot firmware reads data stored in an unencrypted boot sector of the portable storage drive and, upon reading the data, determines that the portable storage drive stores the operating system in a secure manner. The process 200 may then be carried out to determine whether the host machine is permitted to access the secured operating system. The process 200 may be carried out by the host machine according to computer-executable instructions that form an access facility of the boot firmware and/or according to computer-executable instructions that form a part of an access facility stored on the portable storage drive.

The process 200 begins in block 202, in which the access facility obtains information regarding the host machine. The information that is obtained may be any suitable information stored in any suitable manner on the host machine. In some embodiments, the information regarding the host machine may be data stored by a cryptoprocessor of the host machine, such as data stored in a secure storage of the cryptoprocessor. Data stored by the cryptoprocessor may be identifying information for or characteristics of the host machine and/or may be key material stored by the cryptoprocessor. Additionally or alternatively, in some embodiments the information regarding the host machine may be data stored by other components of the host machine, such as identifying information assigned to the host machine and/or assigned to hardware of the host machine. Such identifying information may include identifiers, unique or otherwise, for the host machine and/or the hardware. Such an identifier may be a MAC address for a network interface of the host machine or a network identifier, such as a security identifier (SID), assigned to the host machine by a communication network to which the host machine is or was connected. Data stored by other components of the host machine may also include information stored securely by the boot firmware, such as information stored securely by UEFI-compliant boot firmware. Such information stored by the boot firmware may include system health information or boot measurement information. In various embodiments, therefore, obtaining information regarding the host machine may include obtaining information that identifies the host machine or indicates a status of the host machine.

In block 204, after the information is obtained in block 202, the information may be used to determine whether the host machine is permitted to access the secured data (including the operating system) stored on the portable storage drive. Examples of ways in which the access facility may use the information regarding the host machine in block 204 are discussed in detail below. In some embodiments, for example, the access facility may use the information as part of a decryption operation, such as where the information regarding the host machine is key material. In other embodiments, for example, the access facility may review the information locally and/or remotely to determine whether the host machine is permitted access.

In block 206, the access facility reviews the determination made in block 204. If it is determined that the host machine is permitted access, then in block 208 the secured data stored on the portable storage drive is decrypted and, in block 210, the secured data is accessed and used. Decrypting the secured data may be performed by any suitable component of the host machine, including, in some embodiments, a cryptoprocessor. Accessing and using the decrypted secured data may include booting the operating system stored by the portable storage drive on the host machine by loading instructions of the operating system in a memory accessible by one or more processors of the host machine and executing the instructions on the processor. Once the host machine has booted the operating system, the process 200 ends.

Alternatively, if in block 206 a determination is made that the host machine is not permitted to access the secured data of the portable storage drive, then in block 212 the access facility may alert the host machine that the host machine is not permitted to access the secured data and is not permitted to access the operating system. Alerting the host machine may be carried out in any suitable manner, including through a message explicitly indicating a failure or through an implicit message. An implicit message may be used, for example, where the access facility and/or the host machine (or some component of the host machine) takes an action in block 204, such as interacting with the cryptoprocessor, that is unsuccessful. The host machine may detect the unsuccessful action and infer that access is prohibited. This action may therefore be an implicit message to the host machine that the host machine is not permitted to access the portable storage drive. In some embodiments that use explicit messages, the access facility may alert the boot firmware of the host machine or any other component(s) of the host machine. Further, in some such embodiments that alert the boot firmware, the boot firmware might then display an alert to a user or alert any other entity that the host machine is not permitted to boot from the portable storage drive. Once the access facility has alerted the host machine in block 212, the process 200 ends.

It should be appreciated that embodiments are not limited to implementing the exemplary process 200 and that other processes are possible. In some embodiments, for example, an access facility may, upon determining in block 206 that the information regarding the host machine does not indicate that the host machine is permitted access, may prompt a user of the host machine for a credential, such as a password, that will authorize the host machine to access the secured data of the portable storage drive. In such embodiments, the credential from the user may enable a user to indicate that a host machine is trusted to access the portable storage drive despite that the host machine was not previously authorized to access the portable storage drive. When such a credential is received, the credential may be used in any suitable way to determine that the host machine is permitted access to the secured data of the portable storage drive. In some embodiments, for example, the credential from the user may be used in a decryption operation to gain access to the secured data.

In other embodiments, rather than a user credential being a substitute for information regarding the host machine, the user credential or another credential may be used as an additional requirement on obtaining permission to access the secured data of the host machine. For example, access to the secured data may be regulated by multiple forms of identification, including identification for the host machine and for a user, such that access to the secured data requires a specification of a correct user credential and correct information regarding the host machine.

Further, while FIG. 2 illustrates in block 212 that the access facility may alert the host machine that the host machine is not permitted to access the portable storage drive, in some embodiments the access facility may not alter the host machine in any way, either implicit or explicit.

Figure 3:
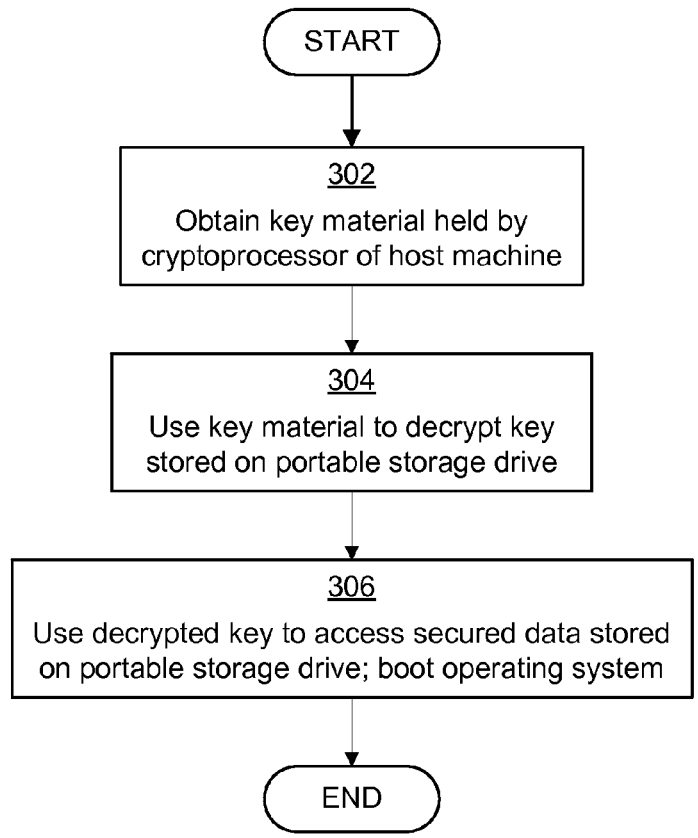
FIG. 3 is a flowchart of an exemplary process for using key material held by a host machine to access secured data of a portable storage drive.
Figure 4:
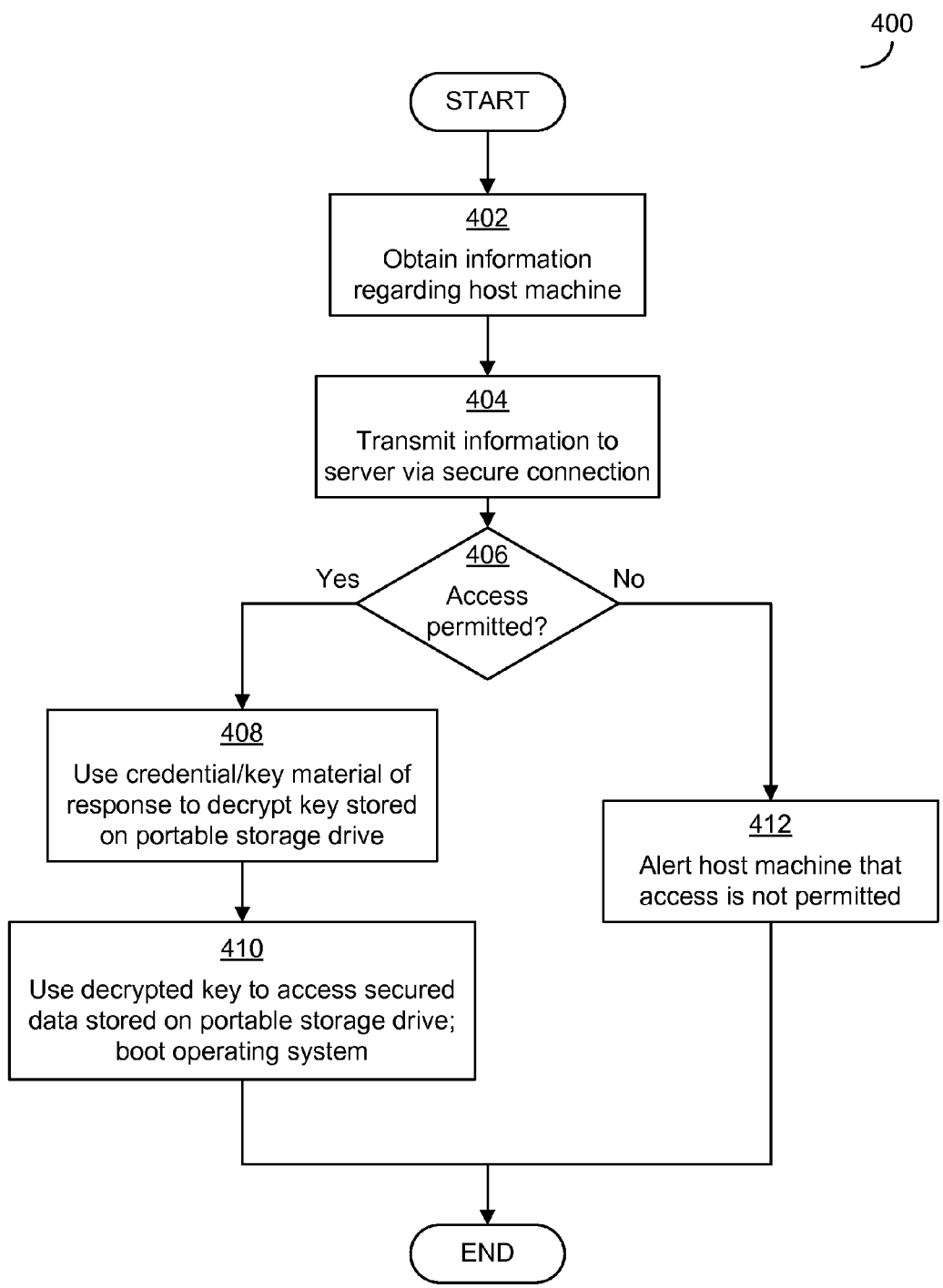
FIG. 4 is a flowchart of an exemplary process for using information regarding a host machine to determine whether the host machine is permitted to access secured data of a portable storage drive.

An access facility may use any suitable information regarding a host machine in any suitable manner to determine whether the host machine is permitted to access secured data stored on a portable storage drive, including an operating system stored on a portable storage drive. FIGS. 3 and 4 illustrate examples of ways in which an access facility may use information regarding a host machine to make such a determination.

Prior to the start of the exemplary process 300 of FIG. 3, as with the process 200 of FIG. 2, a portable storage drive is coupled to a host machine and boot firmware of the host machine attempts to boot from the portable storage drive. Upon determining that the portable storage drive is secured and upon invoking an access facility of either the portable storage drive or the boot firmware, the process 300 begins.

In block 302, the access facility communicates with a cryptoprocessor of the host machine to retrieve key material stored therein. The cryptoprocessor may be any suitable secure hardware of the host machine, including a TPM chip. Such secure hardware may include security storages that store data to be used in security operations, including key material to be used in decryption operations. Some secure hardware may include a set value that acts as both key material and an identifier for the secure hardware, as the set value may be stored in a nonvolatile memory of the secure hardware and be configured either to never be changed or only be changed in response to a specific input that resets the secure hardware. For a TPM chip, a Storage Root Key (SRK) may be such a set value that acts as both key material and an identifier for the TPM chip. The SRK is set for the TPM chip when an entity takes "ownership" of the TPM chip and is not changed until the TPM chip is reset when ownership is transferred. The SRK may act as key material that is only available for a decryption operation when the same TPM chip is available, such that a decryption operation may only be carried out on that same computing device. In the context of the portable storage drive, when the secured data (including the operating system) has been configured to be decrypted using the SRK of the TPM chip for a particular host machine, this indicates that the particular host machine has been previously authorized to access the secured data of the portable storage drive.

After the key material is obtained by the access facility in block 302, the access facility may use the key material to perform a decryption of a key stored on the portable storage drive. As discussed above in connection with FIG. 1, in a BITLOCKER® system, a set of at least three keys may be used to secure data: a first key (FVEK) that encrypts the data, a second key (VMK) that encrypts the first key, and at least one third key that encrypts the second key. Encrypted forms of the first key and second key may be stored on the portable storage drive and retrieved as part of the decryption process when access to the secured data is desired. In some embodiments, the encrypted form of the second key may include multiple encrypted forms, such as one for each host machine that is permitted to access the secured data of the portable storage drive. The SRK for a TPM chip of an authorized host machine may be used as a decryption key for a corresponding encrypted version of the second key. Therefore, in block 304, the access facility may use the key material obtained from the cryptoprocessor in block 302 to decrypt an encrypted version of the second key (the VMK) as part of decrypting the secured data. If the second key is decrypted, the decrypted second key can then be used to decrypt the first key (the FVEK), which can then be used to decrypt the secured data.

An access facility that implements the process 300 of FIG. 3 will therefore determine whether a host machine is permitted to access a portable storage drive by obtaining key material from the host machine and attempting to use the key material in a decryption operation. If the decryption operation is successful, then the host machine is permitted access. If the decryption operation is not successful, then the host machine is not permitted access. Those skilled in the art will appreciate that a decryption operation will not produce a result that indicates success or failure per se, but rather will produce a value that may or may not be correct, depending on whether the correct decryption key was used. Therefore, an indication of the success or failure of the decryption operation may be determined through attempting use of the data in block 306. If the decryption was not successful, then the decrypted versions of the secured data will be merely junk data, the decrypted instructions will not be executable, and the decrypted data will not be useful. Errors may result, which would be indicative of a prohibited access to the portable storage drive.

Accordingly, in block 306, the decrypted key obtained in block 304 is used to decrypt and access the secured data stored on the portable storage drive. Accessing the secured data may include booting the operating system on the host machine, including loading instructions of the operating system into a memory of the host machine and executing the instructions on at least one processor of the host machine. If the host machine is permitted to access the operating system and the decryption was successful, the instructions will execute and the operating system will run smoothly on the host machine.

Once the boot firmware of the host machine has booted or attempted to boot the operating system of the portable storage drive, the process 300 ends.

FIG. 4 illustrates an alternative process 400 for determining whether a host machine is permitted to access secured data of a portable storage drive. As above with the processes 200 and 300 of FIGS. 2-3, the process 400 of FIG. 4 may be carried out by an access facility of boot firmware of a host machine and/or of a portable storage drive when a portable storage drive has been coupled to the host machine and boot firmware of the host machine attempts to boot from the portable storage drive and determines that the drive is secured.

The process 400 of FIG. 4 begins in block 402, in which the access facility obtains information regarding the host machine. The information regarding the host machine may include any suitable information, including one or more identifiers for the host machine and/or status or characteristic information regarding the host machine. Identifiers for the host machine may be any suitable identifiers, including unique identifiers, that indicate an identity of a host machine. Such identifiers may be associated with the host machine and/or with individual hardware components of the host machine.

As examples of hardware identifiers, the identifier may be an identifier for a cryptoprocessor of the host machine (e.g., a TPM ID), an identifier for a network interface of a host machine (e.g., a MAC address), or an identifier for any other hardware. Where such hardware identifiers are used, the hardware identifiers may be fixed identifiers for the hardware that are unchangeable or may be any other suitable identifiers for the hardware.

As an example of a machine identifier, an identifier assigned to the host machine by a network to which the host machine is or was connected may be used as information regarding the host machine. Such an identifier includes an identifier that may have been assigned by an enterprise network, such as an identifier assigned by a MICROSOFT® ACTIVE DIRECTORY® domain controller that assigns identifiers to computing devices or groups of computing devices on a managed network. Alternatively or additionally, an identifier may be a cryptographic key assigned by the domain controller according to a security identifier (SID) held by the domain controller. Similarly, an identifier may be provided to the host machine that is a version of a SID or other assigned identifier, such as a version of the SID encrypted using a certificate of the domain controller or a version of the SID combined with a nonce value and encrypted using the certificate of the domain controller, or a version of the SID and/or a nonce encrypted with a cryptographic key assigned by the domain controller to computing devices or groups of computing devices according to the SID. This version of the identifier could be itself a unique identifier for the host machine that would indicate that the domain controller or other server has previously indicated that the host machine has been identified by that server/controller. Other values could be provided to the host machine, as well, such as an identifier provided by an administrator to the host machine and stored securely on the host machine (e.g., in a secure storage of the host machine or in an encrypted form on the host machine). The presence of such an identifier on the host machine would, again, indicate that some entity has indicated that the host machine has been identified previously.

In addition to or as an alternative to identifiers for the host machine, information regarding a status or characteristic of the host machine may be communicated. Such information may indicate, for example, a characteristic of a boot sequence for the host machine, such as a length of execution for a particular step of the boot sequence. Such values may be measured by a UEFI-compliant boot firmware and may be stored securely by the firmware. Status or characteristic information other than boot information may also be used, as embodiments are not limited in this respect.

Regardless of the type(s) of information regarding the host machine that the access facility obtains in block 402, in block 404 the information is transmitted to the a server via a secure connection. The information may be transmitted in the same form as the information was retrieved in block 402, or the information may be modified in some manner. For example, in some embodiments the information retrieved in block 402 may be encrypted or signed in some manner prior to being transmitted. In other embodiments, the obtained information may be combined with other obtained information, or with some other information, to yield a combined value that is transmitted. For example, a TPM identifier for the host machine may be combined in a mathematical operation with an SID for the host machine and the result may be transmitted to the server. The information may be transmitted in any suitable manner, as embodiments are not limited in this respect.

The secure connection over which the information is transmitted in block 404 may be secured in any suitable manner. In some embodiments, the connection may be physically secure, such as when the information is transmitted via a limited-access physical network like a wired local network. In other cases, the secure connection may be secured using network security techniques like the Internet Protocol Security (IPsec) set of security techniques or may be otherwise secured. Embodiments are not limited to securing the connection in any particular manner.

Transmitting the information to the server acts as a form of authentication for the host machine with which the portable storage drive is to be used. The server may be aware of the type of information that will be obtained for the host machine and may be aware of acceptable values for that information. For example, the server may maintain a list of host machines that are permitted to access the secured data of the portable storage drive and are permitted to boot the operating system of the portable storage drive. The list of permitted machines may include the types of identifiers and/or other information obtained in block 402. By transmitting the information to the server in block 404, the access facility can determine from the server whether the host machine is on the list of permitted host machines and therefore determine whether the host machine is permitted to access the portable storage drive.

In block 406, therefore, the access facility evaluates a response from the server received via the secure connection and determines whether the host machine is permitted to access the secured data. If the response from the server indicates that the host machine is permitted to access the secured data, then in block 408 a credential, such as values to be used as key material, that is included in the response from the server received over the secure connection is used to decrypt a key stored on the portable storage drive (as in block 304 of FIG. 3) and the decrypted key is used to access the secured data and boot the operating system (as in block 306 of FIG. 3). After the operating system boots, the process 400 ends.

If, however, the response from the server indicates that the host machine is not permitted to access the secured data, which may be either an explicit indication of prohibition or by there not being any response from the server (i.e., a silent response or non-response), then in block 412 the access facility might implicitly and/or explicitly alert the host machine (as in block 212 of FIG. 2) that access to the secured data is not permitted by the host machine. The process 400 then ends.

As mentioned above, it should be appreciated that embodiments are not limited to carrying out the exemplary process illustrated in FIG. 4 and that embodiments may implement different processes. For example, while in the example of FIG. 4 the access facility alerts the host machine in block 412 that access is not permitted, in other embodiments the access facility may not alert the host machine in any way, explicit or implicit.

In the examples provided above, either a network server or the portable storage drive was aware of the host machine and the host machine had previously been authorized to access the secured data of the portable storage drive. In the example of FIG. 3, the host machine had been previously authorized to access the secured data through the encryption of the key material on the portable storage drive using key material available on the host machine (e.g., the SRK of the host machine's TPM chip). In the example of FIG. 4, the host machine had been previously authorized to access the secured data through the server adding the host machine to the list of permitted host machines and the server storing a copy of expected values for the information regarding the host machine (e.g., an identifier for the host machine, or expected values for characteristic information for the host machine).

For the host machine to be authorized to access the secured data, a "trust-granting ceremony" can be conducted in which the host machine is evaluated and an entity (e.g., a human user or network entity) that is approved for authorizing host machines for accessing the secured data of the portable storage drive indicates that the host machine is permitted to access the secured data. Such a trust-granting ceremony may be carried out in any suitable manner and may include one or more computing devices other than the host machine that is to be permitted to access the secured data of the portable storage drive.

Figure 5:
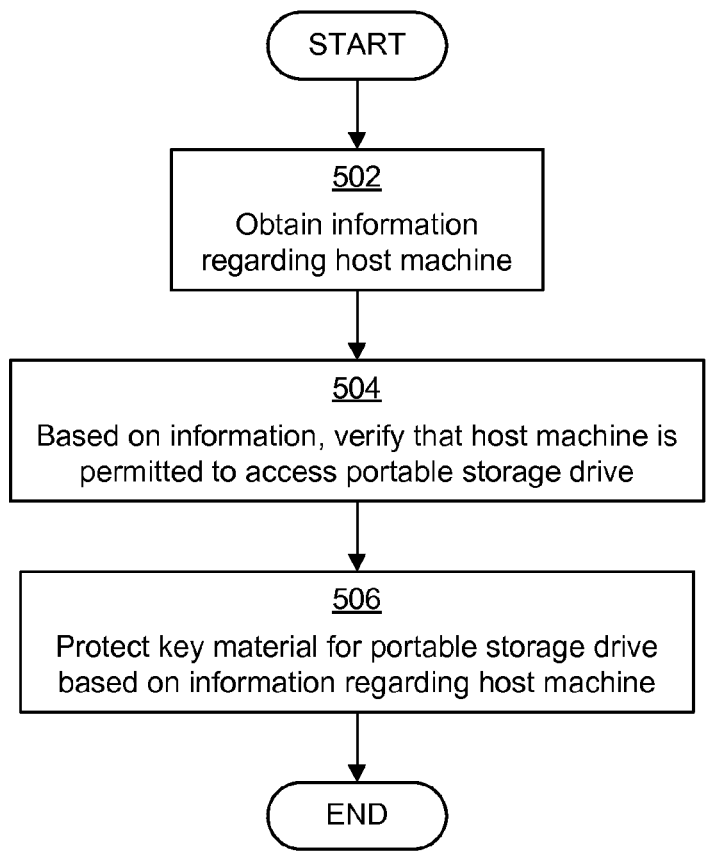
FIG. 5 is a flowchart of an exemplary process for enabling a host machine to access secured data stored on a portable storage drive.

FIG. 5 illustrates one exemplary technique for carrying out a trust-granting ceremony in accordance with techniques described herein. Prior to the start of process 500 of FIG. 5, a host machine may be identified as a machine that a user would like to grant access to the secured data of the portable storage drive. Such a host machine may be, for example, a user's personal home computer that the user would like to grant access to a portable storage drive storing an operating system and files related to the user's employment. Because the user's personal home computer has not been previously authorized by the user's employer to access the secured data of the portable storage drive, the process 500 can be carried out to authorize the personal home computer to do so.

The process 500 begins in block 502, in which information regarding the host machine is gathered. The information-gathering may be carried out by any suitable entity, including an access facility associated with either the host machine or the portable storage drive. For example, in some embodiments an access facility that forms a part of the host machine by being either a part of an operating system of the host machine or a facility installed on the host machine (e.g., after being downloaded from the Web) may include functionality for obtaining information in block 502. In other embodiments, an access facility of the portable storage drive may be responsible for obtaining the information in block 502. The access facility of the portable storage drive may be triggered by an attempt by the host machine to access the secured data that was unsuccessful. In either case, the access facility may, in some embodiments, prompt a user for input instructing the access facility to obtain information regarding the host machine for the purpose of authenticating the host machine for access to the secured data of the portable storage drive.

The information that is obtained by the access facility in block 502 may include any suitable information for authenticating a host machine for access to the secured data. The type(s) of information collected in block 502 may vary depending on policies of an administrator or other entity regarding how to regulate access to the secured data. In some embodiments, the information collected in block 502 may include information regarding a health and/or security of the host machine. Such health and security information may include information indicating a state of the host machine with respect to viruses or other malware, such as whether any has been detected and when the last scan was. The health and security information may also include information on what security functionality is enabled on the host machine, such as whether a virus scanner or firewall is operating on the host machine, and on the strength/configuration of the security functionality that is enabled.

The information that the access facility obtains in block 502 may also include any suitable information for identifying the host machine or otherwise regarding the host machine. This type of information may include any of the various types of information discussed above in connection with FIGS. 2-4. This information regarding the host machine may be used for a similar purpose to the purposes discussed above with respect to FIGS. 2-4, in that the information may be used to identify the host machine, if the host machine is permitted to access the secured data, at a later time when the host machine is attempting to access the secured data (and could be carrying out one of the processes of FIGS. 2-4 or a similar process).

In block 504, after the information regarding the host machine has been obtained in block 504, it is verified, based on the information, that the host machine is permitted to access the secured data of the portable storage drive. The verification of block 504 may be carried out in any suitable manner. In some embodiments, the information obtained in block 502 may be transmitted to a remote computing device for evaluation, and the computing device may respond with an indication of whether the host machine is permitted access. In other embodiments, the information obtained in block 502 may be reviewed locally, by the access facility executing on the host machine, to determine whether the host machine is permitted access to the secured data. In still other embodiments, a combination of local and remote review may be performed to verify whether the host machine is permitted access.

Figure 6:
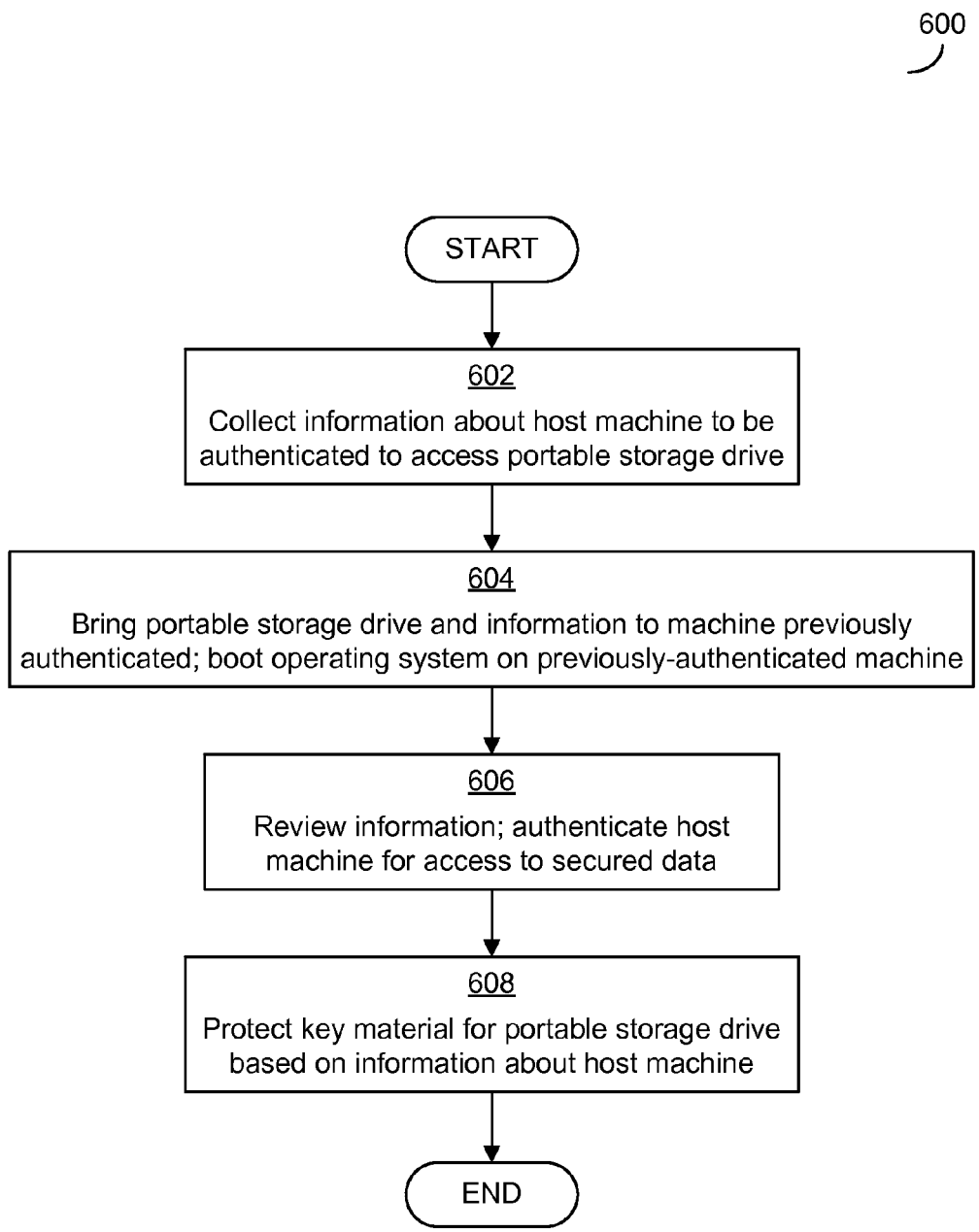
FIG. 6 is a flowchart of an exemplary process for permitting a host machine to access secured data stored on a portable storage drive.

In other embodiments, the access facility that obtained the data in block 502 may play a limited role or no role in the verification of block 504. Rather, in some embodiments, after the information is obtained by the access facility in block 502, the information may be stored in some manner, such as on the portable storage drive, and the portable storage drive may be disconnected from the host machine. The information may then be reviewed on a different computing device, such as a different host machine that was previously authenticated for access to the secured data and is permitted to boot the operating system of the portable storage drive. FIG. 6, discussed below, is an example of a process in which verification may involve a second computing device.

Review of the information, as part of the verification of block 504, may be carried out in any suitable manner and for any suitable purpose. In some embodiments, the review of the information may be carried out to determine whether the host machine is configured in a way that satisfies all elements of a policy regarding access to the secured data. For example, a policy may stipulate that only computing devices that include strong firewalls and up-to-date virus scanners may serve as host machines that are permitted to access the secured data. In other embodiments, the review may be conducted to confirm that the host machine includes all hardware components necessary to determine later whether the host machine is permitted to access the secured data of the portable storage drive. For example, if the process for determining whether a host machine is permitted to access the secured data involves retrieving data from a cryptoprocessor, a review of the information in block 504 to verify whether a particular host machine can be authorized to access the secured data may include determining whether the host machine includes a cryptoprocessor.

In addition to review of the information obtained in block 502, the verification of block 504 may include obtaining credentials from one or more entities. The credentials may be obtained to indicate authorization from a corresponding entity that the host machine is permitted to access the secured data. For example, a human user may be prompted to input a password or other credential to indicate that the human user is authorizing the host machine to access the secured data.

After the verify of block 504, if the host machine is determined to be permitted to access the secured data of the portable storage drive, then in block 506 the access facility may enable the host machine to access the secured data by protecting key material for the portable storage drive based at least in part on the information obtained in block 502. In some embodiments, for example, the protecting of block 506 may include encrypting key material to be used for decrypting the secured data such that the encrypted key material may be decrypted based on information regarding the host machine, such as through the techniques discussed above in connection with FIGS. 2-4.

Once the key material is protected in block 506, the process 500 ends.

Figure 7:
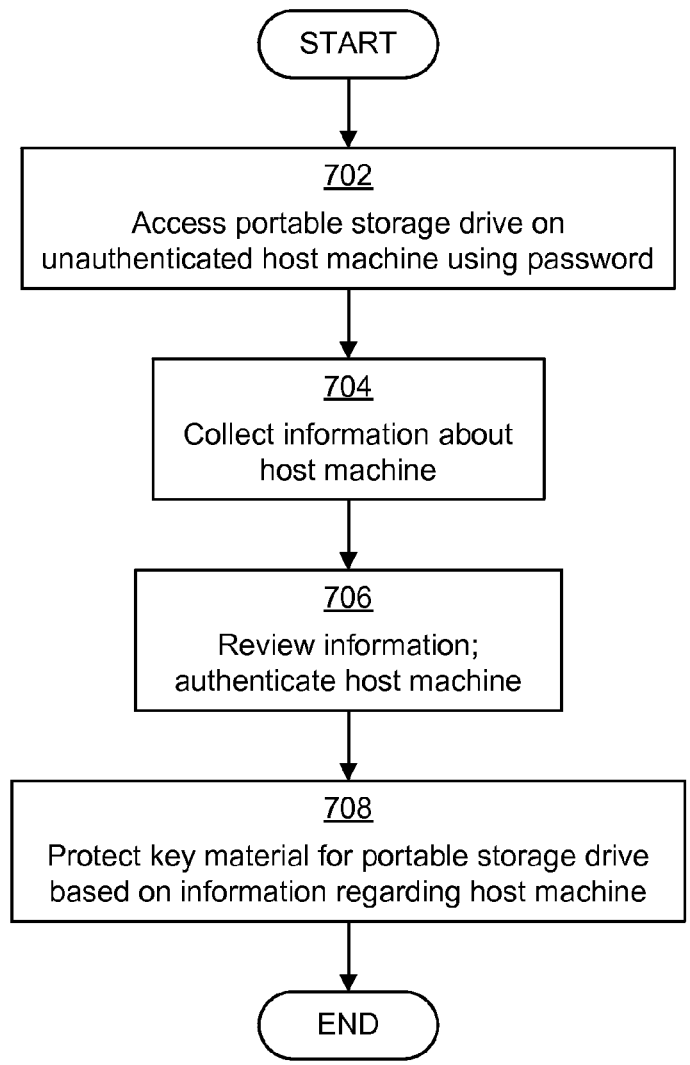
FIG. 7 is a flowchart of another exemplary process for permitting a host machine to access secured data stored on a portable storage drive.

The process 500 for carrying out a trust-granting ceremony may be carried out in any suitable manner, as embodiments are not limited in this respect. FIGS. 6 and 7 illustrate exemplary processes that may be implemented in some embodiments for carrying out a trust-granting ceremony.

The process 600 of FIG. 6 includes a trust-granting ceremony that may be carried out using multiple computing devices. Prior to the start of process 600, a portable storage drive may be connected to a host machine that is to be authorized to access secured data stored on the portable storage drive, including an operating system. Boot firmware of the host machine, upon attempting to boot from the portable storage drive, may initiate the process 600 to authorize the host machine to access the secure data on the portable storage drive. The process 600 may be carried out in any suitable entity, including an access facility of the boot firmware or of the portable storage drive.

The process 600 begins in block 602, in which an access facility collects information about the host machine that is to be authorized to access the portable storage drive. Any suitable information may be collected in block 602, including the exemplary types of information discussed above in connection with block 502 of FIG. 5. Upon collection of the information, the information may be stored on the portable storage drive for later access. The information may be stored on the portable storage drive in any suitable manner, including unencrypted or encrypted in some way.

In block 604, the portable storage drive may be coupled to a second computing device that was previously authorized to act as a host machine for the portable storage drive and to access the secured data stored therein. In block 604, the second computing device may be booted using the operating system stored on the portable storage drive. When the operating system has been loaded and executed, a user may operate the operating system to evaluate the information regarding the host machine that was collected in block 602. This evaluation may be carried out in any suitable manner, including according to any of the exemplary types of review discussed above in connection with block 504 of FIG. 5.

In block 606, the host machine for which the information was collected in block 602 may be authenticated for access to the portable storage drive and to the secured data. The authentication of block 606 may be carried out in any suitable manner, including through collection of credentials from one or more entities. For example, credentials from a network administrator and/or from a user that desires to use the portable storage drive with the host machine may be collected in block 606.

In block 608, after the host machine has been authenticated block 606, key material for the portable storage drive may be protected based on the information for the host machine. As mentioned above in connection with FIG. 5, protection of the key material may include encrypting key material to be used in decrypting the secured data of the portable storage drive using the information regarding the host machine. For example, in some embodiments the information collected in block 602 may include boot measurements stored by a TPM of the host machine and any suitable material for a public key exchange or public key transport, and the protection of the material in block 608 may include encrypting key material for the secured data of the portable storage drive such that the host machine can subsequently decrypt the key material.

Once the key material has been protected in block 608, the process 600 ends.

FIG. 7 illustrates a different process 780 used for a trust-granting ceremony for authorizing a host machine to access a portable storage drive and secured data stored on the portable storage drive. Prior to the start of the process 700, a portable storage drive is connected to a host machine and boot firmware of the host machine attempts to boot using the portable storage drive operating system volume. The process 700 begins in block 702, in which an access facility of the firmware and/or of the portable storage drive prompts a user for a password or other credential for use in accessing the secure data of the portable storage drive. A user password may be used in decrypting the secured data, including the operating system of the secured data, and the firmware may subsequently boot the host machine using the operating system of the portable storage drive. In this way, though the host machine has not been authenticated for access to the secured data, because the user has a credential granting access to the secured data, the host machine may be granted access.

In block 704, a facility is executed on the host machine, during operation of the operating system of the portable storage drive, to collect information about the host machine. The information is collected in block 704 may include any of the exemplary types of information regarding a host machine discussed above, such as in connection with block 502 of FIG. 5.

In block 706, the information about the host machine that was collected in block 704 is reviewed to verify that the host machine is permitted to access the secured data and the host machine is authenticated or access. The review and authentication may be carried out in any suitable manner, including as discussed above in connection with block 504 of FIG. 5.

When the host machine has been authenticated for access to the secured data, the key material for accessing the secured data of the portable storage drive may be protected using information regarding the host machine. This may be carried out in any suitable manner, including as discussed above in connection with block 506 of FIG. 5.

After the key material is protected in block 708, the process 700 ends.

In the example of FIG. 6, the trust-granting ceremony included bringing the portable storage drive between multiple different computing devices so as to ensure that there was a "chain of trust" established authenticating the host machine for access to the secured data. Such a chain of trust was created because an entity that had been authenticated for access to the secured data was the entity that was granting access to the host machine. Similarly, in FIG. 7, a chain of trust is established through the credential provided by the user. As the credential permits a user to access the secured data and the operating system of the secured data, the user is an authorized entity that is granting permission to the host machine to access the secured data.

Obtaining Access to a Remote Network Resource

In accordance with some of the techniques described herein, in some embodiments information regarding a host machine may be used in performing an authentication during establishment of a connection to a remote resource. Such an authentication may be a two-factor authentication that includes providing two credentials as part of an authentication process. The two credentials may include a credential for a user and a credential for the host machine. In some embodiments, the credential for the host machine may be based on information regarding the host machine, including any of the exemplary types of information regarding a host machine discussed above.

In some embodiments, after a host machine has accessed an operating system stored on a portable storage drive (including using any of the techniques described above or by accessing the operating system stored in an unsecured manner) and booted the operating system, during operation of the host machine according to the operating system a request for a two-factor authentication process may be received. In response to such a request, the host machine may receive a credential from a user and may obtain information regarding the host machine to be used in responding to the request for two-factor authentication. Any suitable component of the host machine may receive the credential from the user and obtain the information regarding the host machine, including an authentication facility executing on the host machine.

Figure 8:
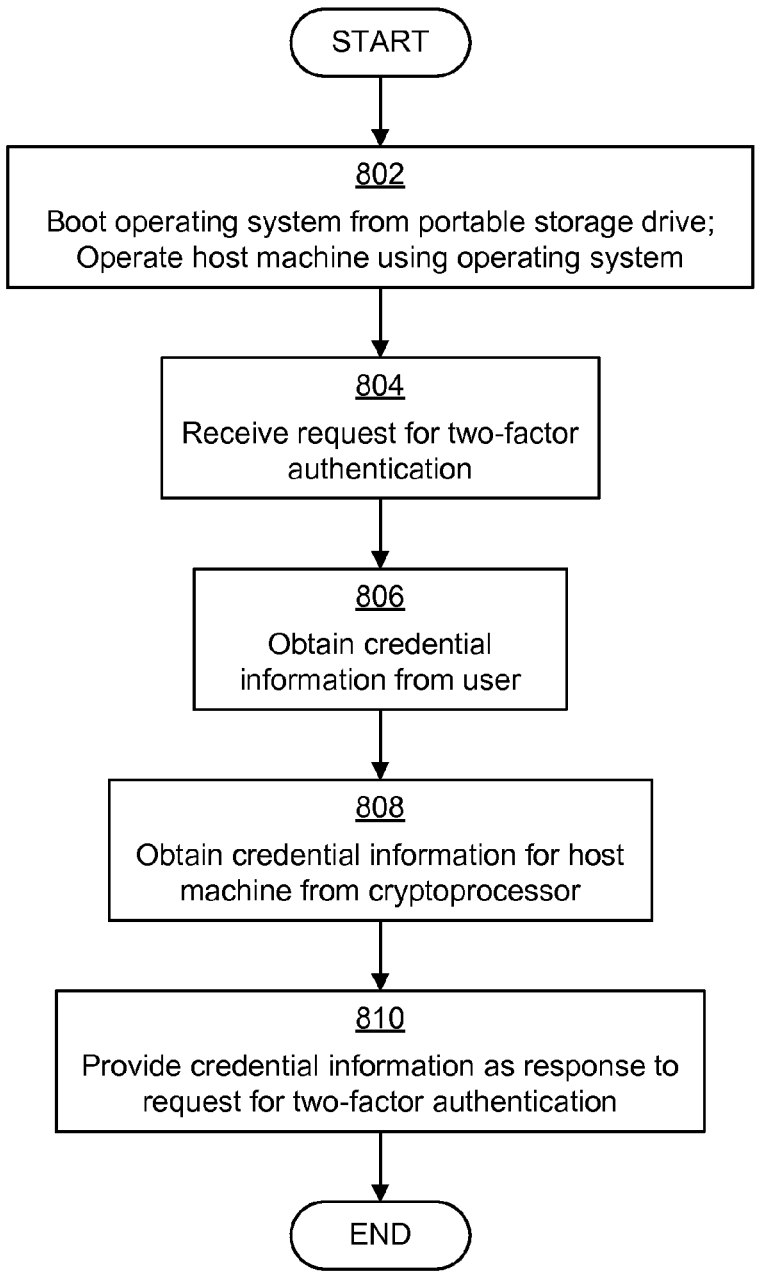
FIG. 8 is a flowchart of an exemplary process for performing a two-factor authentication using information about a host machine.

FIG. 8 illustrates one exemplary process 800 that may be carried out in some embodiments for providing credentials as part of an authentication process. Prior to the start of the process 800, a portable storage drive storing an operating system (in either an unsecured or secured manner) is connected to the host machine and boot firmware of the host machine begins the process of booting from the portable storage drive.

The process 800 begins in block 802, in which the boot firmware of the host machine boots the host machine using the operating system of the portable storage drive. After the host machine has been booted, the host machine is operated according to the operating system.

In block 804, sometime after the host machine is booted and during operation of the host machine, an authentication facility receives a request to perform a two factor authentication for accessing a remote resource. The remote resource may be any suitable remote resource, including a computing device of a network with which the portable storage drive, the operating system, and/or the host machine are associated. The computing device may be, for example, a server to which a user desires access. The request for two factor authentication may be received in block 804 in response to an attempt to connect to the remote resource triggered by a user or other entity of the host machine, though embodiments are not limited in this respect.

After the request is received in block 804, a response to the request may be compiled. Compiling the request may include obtaining two credentials to satisfy the request for two-factor authentication. Accordingly, in block 806, credential information may be obtained from a user. The user's credential information may be obtained in response to a prompt to the user for the credential information. The credential information for user may include any suitable form of credential, as embodiments are not limited in this respect. In some embodiments, for example, the credential for the user may include a password and/or biometrics for the user.

In block 808, credential information for the host machine may be obtained. Credential information for host machine may include any suitable form of credential. In some embodiments, the credential may include information regarding the host machine. The information regarding host machine may include information that identifies the host machine, including information that uniquely identifies the host machine. Various types of information regarding a host machine were discussed above in connection with FIGS. 2-7 and any of these types of information regarding the host machine may be used as a credential or as part of obtaining a credential. In some embodiments, the information regarding the host machine may include information obtained from a cryptoprocessor of the host machine. Information obtained from the cryptoprocessor may include an identifier for the cryptoprocessor or information stored in a secure storage of the cryptoprocessor. Information stored in the secure storage may include a user credential that was pre-provisioned in the cryptoprocessor.

After the user credential is received, in block 806 and the host machine credential is obtained in block 808, the credential information may be provided as a response to the request for two-factor authentication received in block 804. The credential information may be provided in block 810 in any suitable form. In some embodiments, this may take the form of releasing a credential, or proof of access to a credential, that was stored on the cryptoprocessor and secured by a user credential. In other embodiments, the two credentials may be provided individually, while in still other embodiments the credentials may be provided together in some manner, such as being merged. For example, in some embodiments the credential for the host machine may be used to secure the user credential, such as by encrypting the user credential.

After the credential information has been provided in block 810, the process 800 ends.

Figure 9:
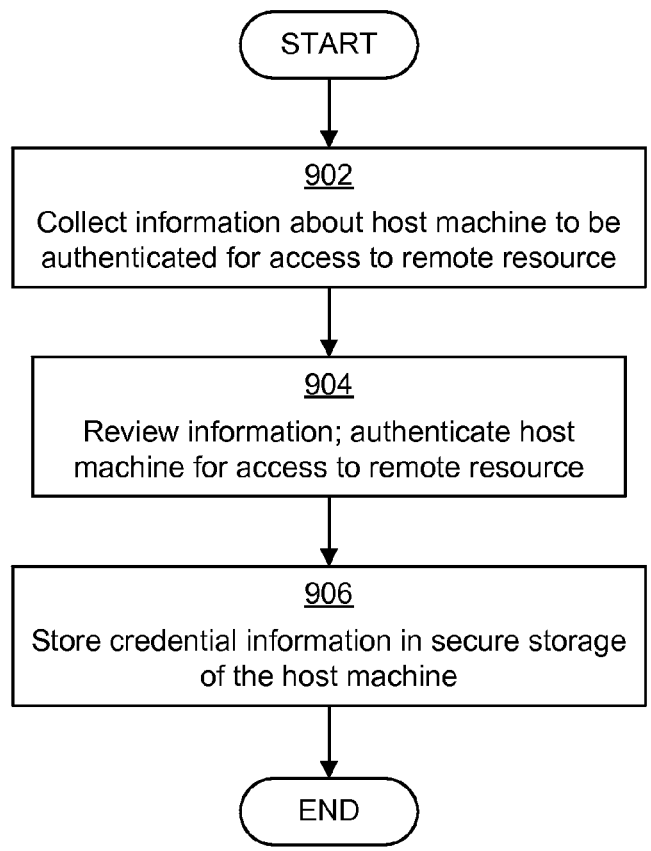
FIG. 9 is a flowchart for storing information on a host machine to be used in a two-factor authentication.

In some embodiments, as discussed above in connection with FIG. 8, the information regarding the host machine may be a user credential that was pre-provisioned on the host machine for use in two-factor authentication when the operating system of the portable storage drive is booted. The user credential may be pre-provisioned in any suitable manner. FIG. 9 illustrates one exemplary process that may be carried out in some embodiments for pre-provisioning a user credential on a host machine.

Prior to the start of the process 900, a portable storage drive is coupled to a host machine and the host machine boots an operating system from the portable storage drive. During operation of the host machine according to the operating system, an entity (such as a user) requests that the host machine be authenticated for access to a remote resource. In response, an authentication facility of the host machine performs the process 900.

The process 900 begins in block 902, in which information about the host machine is collected. The information that is collected in block 902 may be any suitable information, including information regarding a health or security of the host machine and/or information identifying the host machine. Exemplary types of information that may be collected in block 902 are those that were discussed above in connection with block 602 of FIG. 6. The information that was discussed in connection with block 602 is being collected to authenticate the host machine for access to a portable storage drive may also be collected in block 902 to authenticate the host machine for access to the remote resource.

In block 904, after the information is collected by the authentication facility in block 902, the information may be reviewed. Information may be reviewed in any suitable manner by any suitable entity. In some embodiments, the authentication facility may review the information locally on the host machine, while in other embodiments the information may be transmitted by the authentication facility to another computing device or to another facility of the host machine. The review that is conducted in block 904 may include review of the information regarding the host machine to determine whether the host machine satisfies all elements of a policy regarding remote access to the remote resource. Also in block 904, the host machine may be authenticated for access to the remote resource. The authentication block 904 may be based on the review of the information and the authentication may be received from any suitable one or more entities. In some embodiments, the authentication may be provided by a network administrator or a network resource, while in some embodiments the authentication may be additionally or alternatively provided by a user. The authentication that is provided in block 904 may be a verification that the host machine is permitted to access the remote resource.

In block 906, in response to the host machine being authenticated for remote access and while the operating system is being executed on the host machine, credential information may be stored in a secure storage of the host machine. The credential information may be any suitable credential information, including credential information for a user and/or for the host machine. The credential information may also be stored in any suitable location, including a secure storage of a cryptoprocessor of the host machine.

After the credential information is stored in the secure storage, a process 900 ends.

Exemplary Systems Implementing Techniques Described Herein

Techniques operating according to the principles described herein may be implemented in any suitable manner. Included in the discussion above are a series of flow charts showing the steps and acts of various processes that regulate access according to information regarding a host machine of a portable storage drive that stores an operating system. The access that is regulated may be access to secured data of the portable storage drive, including the operating system, and/or access to a remote resource when the operating system is executed on the host machine. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program. In other implementations, the functional facilities may be adapted to interact with other functional facilities to implement boot firmware of a computing device. In still other implementations, the functional facilities may be adapted to interact with other functional facilities in such a way as form an operating system, including the WINDOWS TO GO™ operating system, available from the Microsoft® Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1006 of FIG. 10 described below (i.e., as a portion of a computing device 1000) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device/processor, such as in a local memory (e.g., an on-chip cache or instruction register, a computer-readable storage medium accessible via a bus, a computer-readable storage medium accessible via one or more networks and accessible by the device/processor, etc.). Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 10:
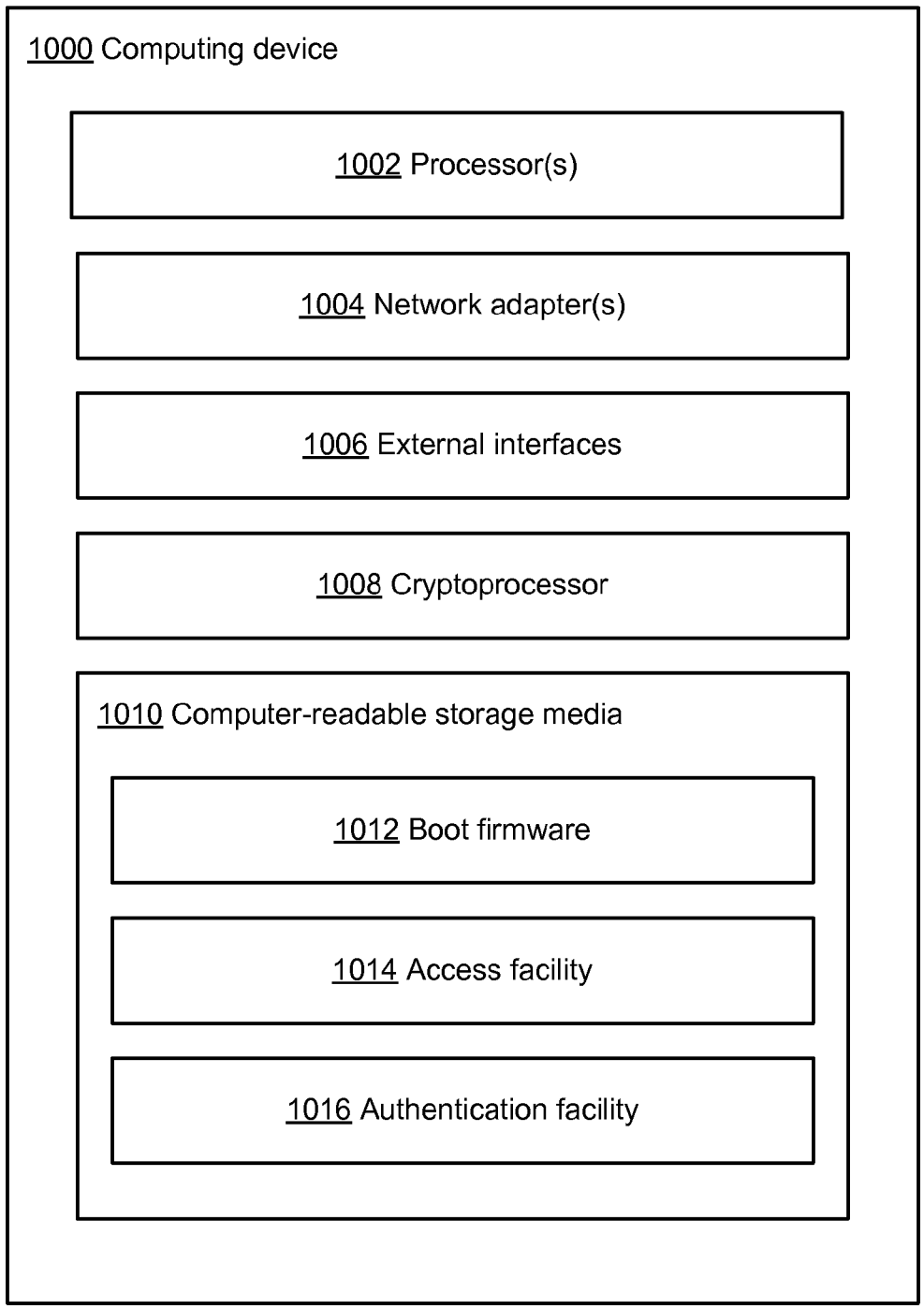
FIG. 10 is a block diagram of an exemplary computing device with which some embodiments may operate.

FIG. 10 illustrates one exemplary implementation of a computing device in the form of a computing device 1000 that may be used as a host machine in a system implementing the techniques described herein, although others are possible. It should be appreciated that FIG. 10 is intended neither to be a depiction of necessary components for a computing device to operate in accordance with the principles described herein, nor a comprehensive depiction.

Computing device 1000 may comprise at least one processor 1002, a network adapter 1004, external interface(s) 1006, a cryptoprocessor 1008, and computer-readable storage media 1010. Computing device 1000 may be, for example, a desktop or laptop personal computer, a personal digital assistant (PDA), a smart mobile phone, a server, or any other suitable computing device. Network adapter 1004 may be any suitable hardware and/or software to enable the computing device 1000 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. The external interface(s) 1006 may be any suitable hardware interface for establishing communication with external resources of the computing device 1000, such as a portable storage drive. In some embodiments, for example, the external interface(s) 1006 may include a USB interface. The cryptoprocessor 1008 may be any suitable secure hardware of the computing device 1000 for performing security functionality. For example, in some embodiments the cryptoprocessor 1008 may include a TPM chip.

Computer-readable media 1010 may be adapted to store data to be processed and/or instructions to be executed by processor 1002. Processor 1002 enables processing of data and execution of instructions. The data and instructions may be stored on the computer-readable storage media 1006 and may, for example, enable communication between components of the computing device 1000.

The data and instructions stored on computer-readable storage media 1006 may comprise computer-executable instructions implementing techniques which operate according to the principles described herein. In the example of FIG. 10, computer-readable storage media 1006 stores computer-executable instructions implementing various facilities and storing various information as described above. Computer-readable storage media 1006 may store boot firmware 1012 that may be responsible for booting the computing device 1000 using an operating system stored locally and/or on a portable storage drive connected to the computing device 1000 via an external interface 1006. The computer-readable storage media 1010 may also include an access facility 1014 that may be a part of or separate from the boot firmware 1012. The access facility 1014 may operate to determine whether the computing device 1000, when acting as a host machine for a portable storage drive, is permitted to access secured data of the portable storage drive, including an operating system. The computer-readable storage media 1010 may also store an authentication facility 1016, which may operate to transmit credential information for a user and a host machine in response to a request for two-factor authentication.

While not illustrated in FIG. 10, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for enabling a host machine to access a portable storage drive having stored thereon an unencrypted program, an operating system, and a boot sector, the portable storage drive storing encrypted data, the encrypted data comprising the operating system, the method performed by the host machine and comprising:
as part of a boot sequence being performed by the host machine, loading the program from the portable storage device to run on the host machine, the portable storage device storing encrypted keys unique to respective host machines that are particularly authorized to boot the portable storage device;
receiving, by the program, a first key from a trusted platform module of the host machine and using, by the program, the first key to attempt a decryption operation to determine if the host machine is permitted access to the portable storage device, and the program:
based on a determination that the host machine is permitted access to the portable storage device, responding by using the first key to obtain a decrypted key by decrypting a one of the encrypted keys retrieved from the portable storage drive that corresponds to the host machine;
based on a determination that the host machine is not permitted access to the portable storage device, responding by prompting a user of the host machine to provide a credential, and responding to receiving the credential by determining that the credential is valid and in response providing the encrypted key in unencrypted form to the host machine; and
performing decryption on the operating system according to the key received from the portable storage device and attempting to boot, as part of the boot sequence, correspondingly decrypted executable code of the operating system from the portable storage device.

2. The method of claim 1, wherein the decrypted executable code is provided to boot firmware of the host machine.

3. The method of claim 1, wherein success or failure of the decryption of the operating system is determined by the attempting to boot the decrypted executable code of the operating system.

4. The method of claim 3, wherein the first key is obtained from a cryptoprocessor of the host machine.

5. The method of claim 1, wherein:
the portable storage drive comprises a solid-state memory.

6. A portable storage device to be accessed by a host machine, the portable storage device comprising:
an unencrypted program, an operating system, and a boot sector, the portable storage device storing encrypted data, the encrypted data comprising the operating system;
the program configured to be loaded, as part of a boot sequence being performed by the host machine, the portable storage device storing encrypted keys unique to respective host machines that are particularly authorized to boot the portable storage device;
the program further configured to be loaded from the portable storage device to run on the host machine, and when so loaded and run:
receive a first key from a trusted platform module of the host machine and use the first key to attempt a decryption operation to determine if the host machine is permitted access to the portable storage device,
based on a determination that the host machine is permitted access to the portable storage device, respond by using the first key to obtain a decrypted key by decrypting a one of the encrypted keys retrieved from the portable storage drive that corresponds to the host machine;
based on a determination that the host machine is not permitted access to the portable storage device, respond by prompting a user of the host machine to provide a credential, and respond to receiving the credential by determining that the credential is valid and in response providing the encrypted key in unencrypted form to the host machine; and
provide the key received from the portable storage device to the trusted platform module, which in turn performs decryption on the operating system, and wherein correspondingly decrypted executable code of the operating system from the portable storage device is booted as part of the boot sequence.

7. The portable storage device of claim 6, wherein the decrypted executable code is provided to boot firmware of the host machine.

8. The portable storage device according to claim 6, wherein success or failure of the decryption of the operating system is determined by the attempting to boot the decrypted executable code of the operating system.

* * * * *